(12) United States Patent
Tolen et al.

(10) Patent No.: US 11,224,113 B2
(45) Date of Patent: Jan. 11, 2022

(54) LIGHTING SYSTEM

(71) Applicant: VISTA Manufacturing Inc, Elkhart, IN (US)

(72) Inventors: Alexander Tolen, Mishawaka, IN (US); Mitchell Bruhn, Elkhart, IN (US)

(73) Assignee: VISTA Manufacturing Inc, Elkhart, IN (US)

( * ) Notice: Subject to any disclaimer, the term of this patent is extended or adjusted under 35 U.S.C. 154(b) by 0 days.

(21) Appl. No.: 16/866,693

(22) Filed: May 5, 2020

(65) Prior Publication Data

US 2020/0359487 A1 Nov. 12, 2020

Related U.S. Application Data

(60) Provisional application No. 62/844,046, filed on May 6, 2019.

(51) Int. Cl.
*H05B 47/19* (2020.01)
*G06F 3/0482* (2013.01)
*H05B 45/20* (2020.01)

(52) U.S. Cl.
CPC ........... *H05B 47/19* (2020.01); *G06F 3/0482* (2013.01); *H05B 45/20* (2020.01)

(58) Field of Classification Search
CPC ..... H05B 47/19; H05B 45/20; H04L 12/2827; H04L 12/2823; Y02B 20/40
See application file for complete search history.

(56) References Cited

U.S. PATENT DOCUMENTS

| | | | | |
|---|---|---|---|---|
| 9,985,786 | B1 * | 5/2018 | Bhabbur | H04L 9/3226 |
| 2015/0263861 | A1 * | 9/2015 | Kumar | H04L 9/3271 |
| | | | | 713/168 |
| 2015/0372754 | A1 * | 12/2015 | Choi | H04W 76/10 |
| | | | | 398/130 |
| 2016/0342297 | A1 * | 11/2016 | Ellwood | G06F 3/04883 |
| 2017/0127499 | A1 * | 5/2017 | Unoson | H05B 47/105 |
| 2017/0339770 | A1 * | 11/2017 | Kim | H05B 47/16 |
| 2018/0332692 | A1 * | 11/2018 | Feil | H04W 12/033 |
| 2019/0132931 | A1 * | 5/2019 | Sharma | H04W 12/06 |

* cited by examiner

*Primary Examiner* — Renan Luque
(74) *Attorney, Agent, or Firm* — Warner Norcross + Judd LLP

(57) ABSTRACT

A lighting system includes a light assembly and a remote control device. The light assembly includes a plurality of lights, such as LEDS, a controller for connection to a power source and which controls the lights, and a wireless transceiver for communication with the remote control device. Additionally, the remote control device is configured to detect the light assembly, to transmit a pairing signal to the light assembly, which prompts the light assembly to generate a non-numerical code, and to pair the light assembly with the remote control device in response to input from a user at the remote control device prompted by the non-numerical code.

18 Claims, 4 Drawing Sheets

Screen shot 1: "Lights" screen

Screen Shot 2: Select a light

Screen Shot 3: Accept the pair request

Screen Shot 4: Color match Pairing, First Color
After accepting the pair request, the light you are pairing to will change to a random color (Red, Green, Blue, or White). Tap on the color tile that matches the color of the light.

Screen Shot 5: Color match Pairing, Second Color
After matching the color in the above step, the color of the light will change to a second random color. Tap on the color tile that matches the color of the light again.

Screen Shot 6: Color match Pairing, Third Color
After matching the color in the above step, the color of the light will change to a third random color. Tap on the color tile that matches the color of the light again.

Screen Shot 7: Pairing successful
After matching the color of the light 3 times, correctly, in the steps above, a message will appear that states "Pairing Status Paired". You can then control the light you are connected to.

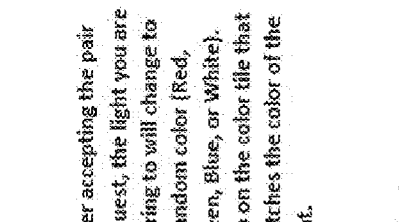

After accepting the pair request, the light you are pairing to will change to a random color (Red, Green, Blue, or White). Tap on the color tile that matches the color of the light.

Screen Shot 4: Color match Pairing, First Color

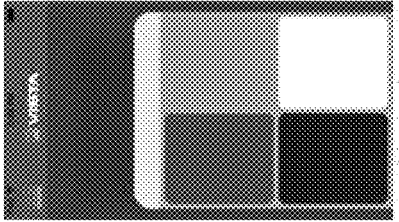

Screen Shot 3: Accept the pair request

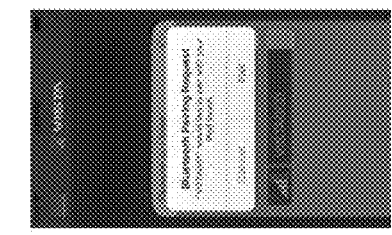

Screen Shot 2: Select a light

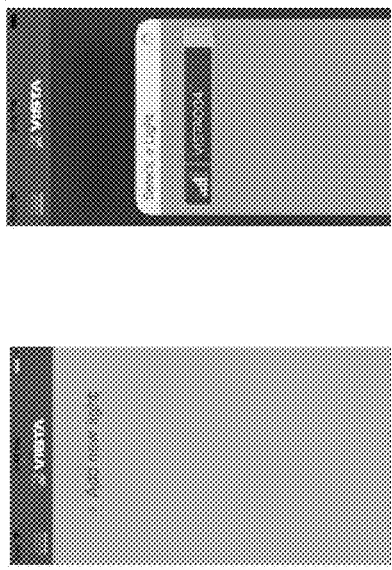

Screen shot 1: "Lights" screen

After matching the color in the above step, the color of the light will change to a second random color. Tap on the color tile that matches the color of the light again.

Screen Shot 5: Color match Pairing, Second Color

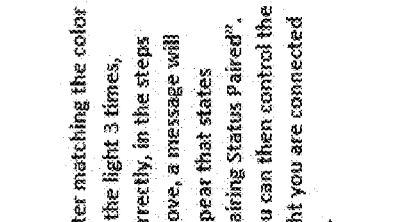

After matching the color of the light 3 times, correctly, in the steps above, a message will appear that states "Pairing Status Paired". You can then control the light you are connected to.

Screen Shot 7: Pairing successful

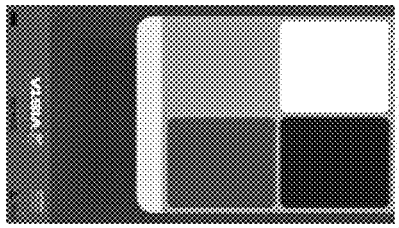

After matching the color in the above step, the color of the light will change to a third random color. Tap on the color tile that matches the color of the light again.

Screen Shot 6: Color match Pairing, Third Color

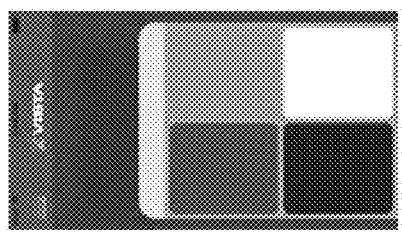

FIG. 3

# LIGHTING SYSTEM

TECHNICAL FIELD AND BACKGROUND

The present disclosure relates to wireless control of lighting assemblies.

Light assemblies may be used in a variety of different applications. For example, the light assemblies described here may be used in outdoor applications, such as such marine, tractor trailer, recreational vehicle (RV), or aviation applications, or in indoor applications, such as on furniture or appliances. Many times, the location of the light assemblies makes it difficult to reach for manual control of the light output or alternately require extensive wiring to provide remote control. In many applications, it may be desirable to control the operation of a light assembly using a wireless control due to the light assembly's inaccessibility, as noted, and/or for safety reasons where remote control provides enhanced security.

SUMMARY

In one embodiment, a lighting system includes a light assembly and a remote control device. The light assembly includes a plurality of lights, such as LEDS, a controller for connection to a power source and which controls the lights, and a wireless transceiver for communication with the remote control device. Additionally, the remote control device is configured to detect the light assembly, to transmit a pairing signal to the light assembly, which prompts the light assembly to generate a non-numerical code, and to pair the light assembly with the remote control device in response to input from a user at the remote control device prompted by the non-numerical code.

In one aspect, the remote control device is configured to determine whether the light assembly is pairable prior to transmitting the pairing signal.

In another aspect, the non-numerical code comprises energy, such as light, emitted by the light assembly.

For example, the non-numerical code comprises the color of light emitted by the light assembly, and optionally a series of colors of light emitted by the light assembly.

In another embodiment, a method of associating electronic devices to allow remote control of at least one of the electronic devices includes detecting a light assembly and transmitting a pairing signal to the light assembly to prompt the light assembly to generate a non-numerical code. Based on user input at the remote control device in response to the non-numerical code, the method further includes pairing the remote control device with the light assembly.

BRIEF DESCRIPTION OF THE DRAWINGS

FIG. 3 is a series of screen shots of the display of a remote control device incorporating one embodiment of the non-numerical code generated by the system and the method of FIGS. 1, 2A and 2B.

DETAILED DESCRIPTION

The following detailed description is directed to a lighting system in which one or more light assemblies are paired with a remote control device. Although described in the context of light assemblies that are used primarily for illumination, the light assemblies may be used for other functions, including simply for generating a non-numerical code for pairing two or more devices together.

Figure 1:
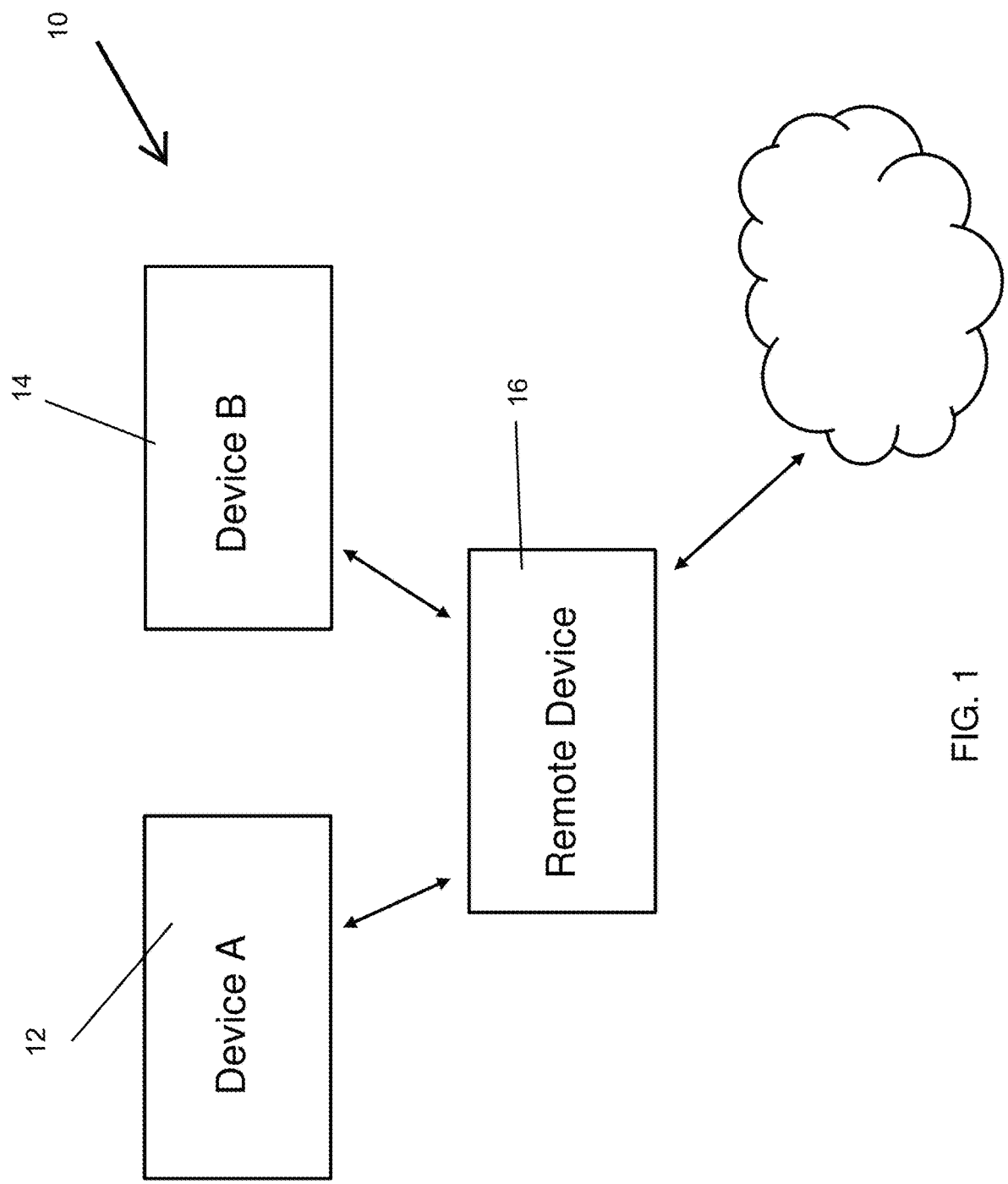
FIG. 1 is a block diagram illustrating an example system of wirelessly connected devices.

Referring to FIG. 1, the numeral 10 generally designates a lighting system. Lighting system includes one or more light assemblies 12, 14, which are suitable for illumination in a wide variety of applications, including for example, vehicles, including recreational vehicles, and boats, and a remote control device, 16. As will be more fully described below, each or both light assemblies 12, 14 are paired with the remote control device, 16, to reduce inadvertent control of the light assemblies by third parties.

In the illustrated embodiment, light assemblies 12, 14 each include a plurality of light sources, such as LEDS, and optionally, light sources that produce colored light, such as red, green, blue, and white light. For example, suitable light sources may comprise RGBW LEDS. Optionally, the light sources are mounted on a printed circuit board, such as a flexible or rigid circuit board. For further details of an optional flexible light assembly, reference is made to Prov. Appl. Ser. No. 62/740,644, filed on Oct. 3, 2018, which is incorporated by reference herein in its entirety.

In addition, each light assembly 12, 14 includes a controller (with a processor and with or in communication with sufficient memory to perform the functions described herein) to control the light sources (when coupled to a power supply) and, further, a wireless transceiver, such as Bluetooth transceiver. The transceiver allows for remote control of the respective light assembly via remote control device 16, which also includes a controller (with a processor and with or in communication with sufficient memory to perform the functions described herein) and a wireless transceiver. The controller and/or the wireless transceiver of the light assembly may be integrated into the respectively light assembly (as described in the referenced application) or may be coupled to the light assembly circuit board through conventional electrical leads.

When powered and using a Bluetooth transceiver, the transceiver optionally, continuously broadcasts a signal (as long as it is not connected to a device already) with an ID, which signal (and ID) is received by the remote control device 16 and indicates to the application stored in the remote control device, described below, that the light assembly 12, 14, is available for pairing.

In the illustrated embodiment, remote control device 16 comprises a smart phone, such as an iPhone®, with a touch screen display and an application installed therein that is configured to allow the phone to receive a signal and ID from each light assembly 12, 14 (via their Bluetooth transceiver ("Bluetooth module") and pair with each of the light assemblies. Optionally, the application is configured to allow the phone to receive a signal and ID from each light assembly 12, 14 (via their Bluetooth transceiver ("Bluetooth module") and pair with both of the light assemblies as a group. Pairing is a process by which devices register with each other. Once paired, devices typically can communicate with each other whenever they are within range and active without re-performing the pairing process.

Optionally, before pairing, the remote control device 16 and light assembly or assemblies 12, 14, may first detect each other. Upon detection, the remote control device and the light assembly or assemblies may then pair with each other, as described below. Several common applications for light assemblies 12, 14 include the use of the light assemblies in close proximity to a third party who may be using the same lights—for example, in marine applications or recreational vehicle applications, where two users are often within range of a standard Bluetooth transceiver, for example, within 20 feet, 15 feet, or even 10 feet of each other. As such, remote control of these light assemblies without pairing may result in advertent control of one's neighbor's light assemblies. In the present disclosure, pairing, therefore, may provide at least a limited security function—for example, to limit inadvertent control by a third party.

Figure 2A:
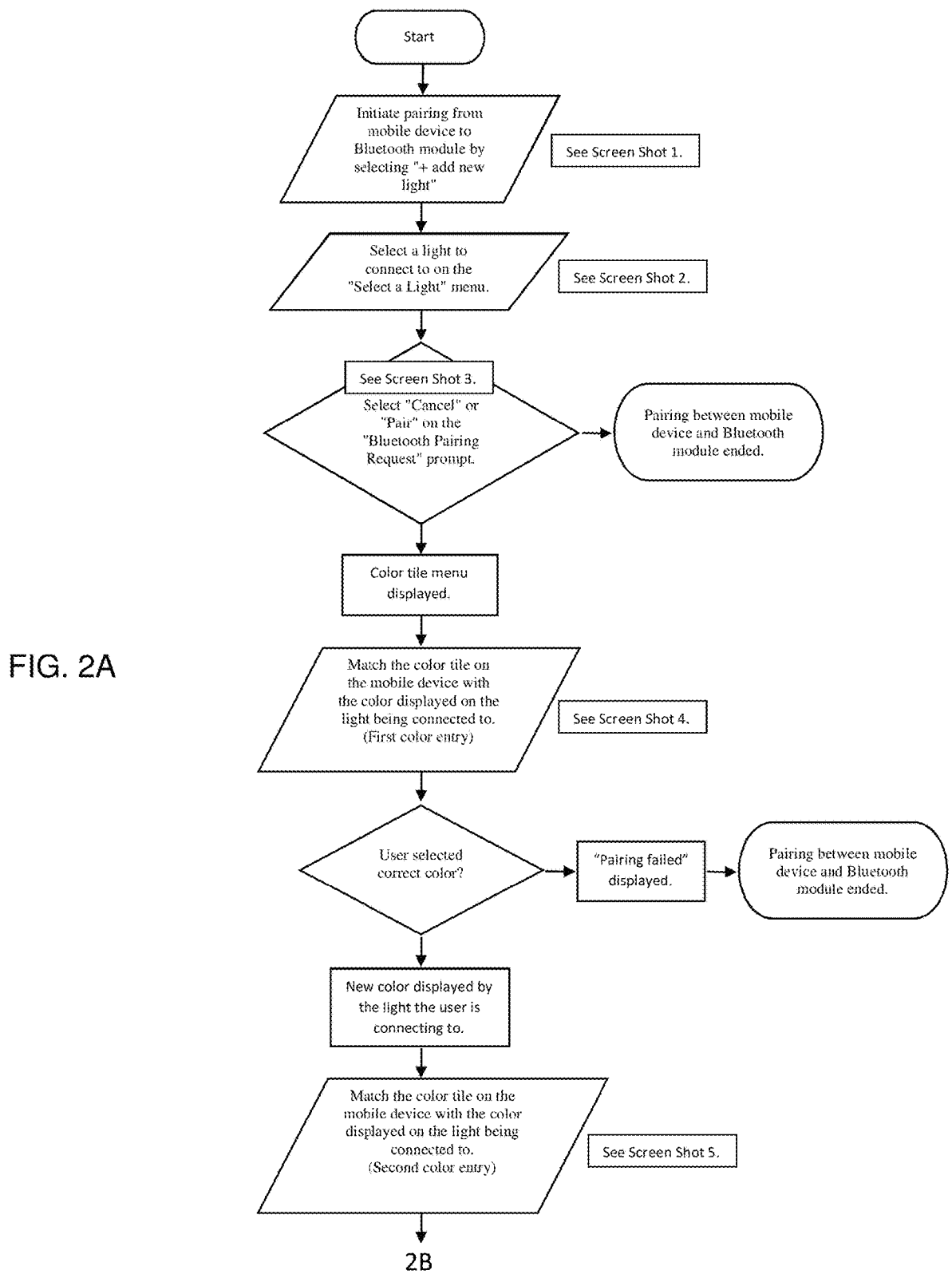
FIG. 2A is a portion of a flowchart illustrating an example of a method of pairing devices, such as in the example system of FIG. 1.
Figure 2B:
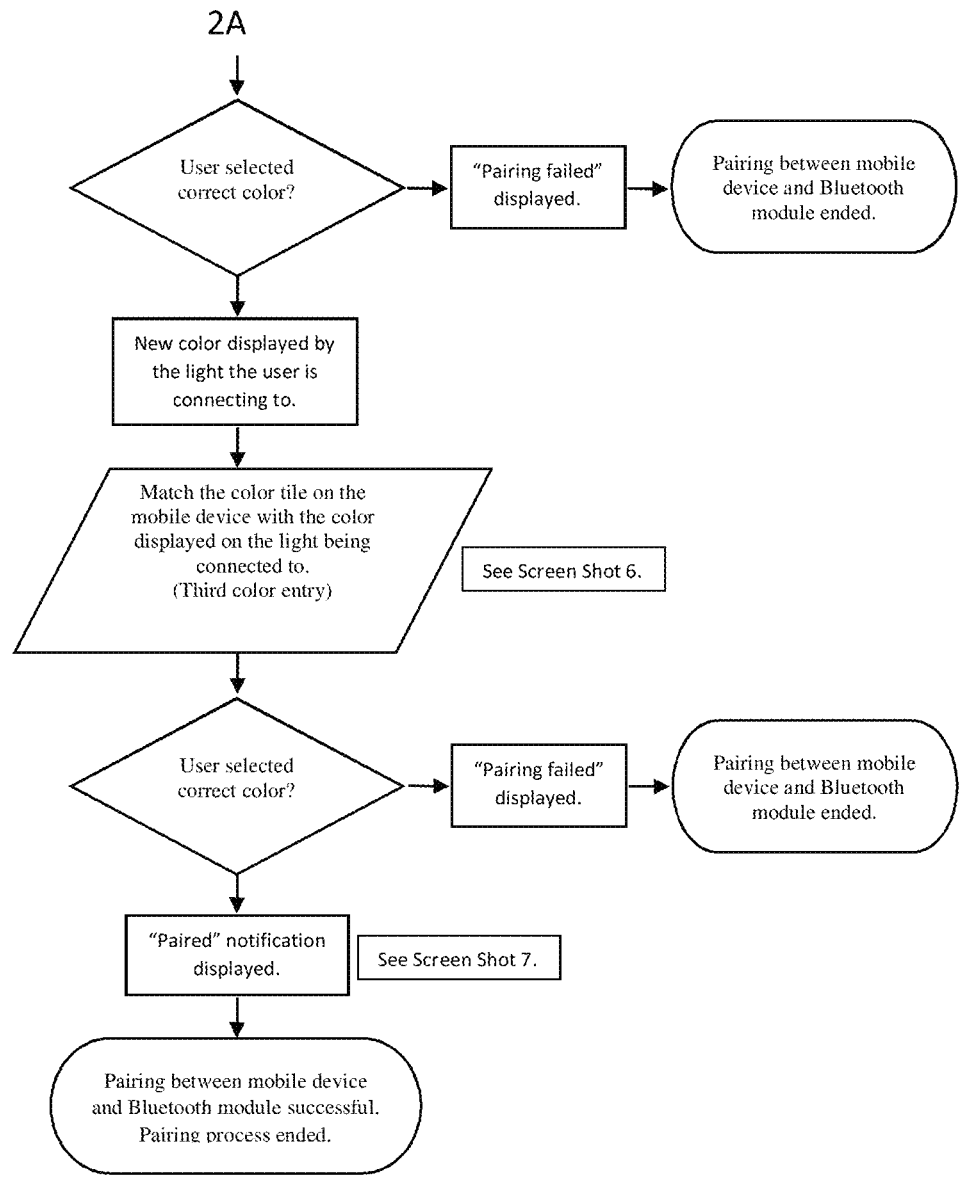
FIG. 2B is the other portion of the flowchart of FIG. 2A.

As will be more fully described in reference to FIGS. 2A and 2B, to pair the light assemblies 12, 14 with remote control device 16, the application stored in the remote control device 16 is configured to eliminate the need for a numerical passkey. Instead, the application stored in the remote control device 16 is configured to prompt light assemblies 12, 14 to generate a non-numerical code, which then prompts a user to input a code into the remote control device, which is then matched with the non-numerical code generated by the respective light assembly to determine whether the respective light assembly should be paired. Once matched, the controller pairs the devices together. Optionally, a time out period may be provided in the application, which gives a user a limited time in which to successfully pair their remote control device with the light assembly or assemblies. If the user is not successful in the time out period, the application will not pair the remote control device with the light assembly or assemblies.

Although described below in reference to the use of a series of colors as the non-numerical code output of the light assemblies and the use of the same colors as a non-numerical code input into the remote control device, it should be understood that the non-numerical code output need not match the code input. Further, it may be represented by a single output—not a series of outputs.

For example, the non-numerical code output may simply be the "on state" of the light assembly, with the corresponding code input simply being the word "on" or an icon, such as a check or X in a box that appears when pressed. Further, the non-numerical code output may be flashes or blinks of the light, while the corresponding code input may be a numerical code that corresponds to the number of flashes or blinks.

Additionally, in yet other embodiments, the non-numerical code output may be a sound, with the corresponding code input simply providing a positive indication that the sound was heard—e.g. a word or symbol, such as yes, a check, a plus sign, etc. indicating that the user heard the sound.

Referring to FIGS. 2A, 2B, and 3, the application stored in device 16 of system 10 starts by initiating the pairing from the remote control device (hereinafter referred to as the mobile device) to the Bluetooth module of the light assembly by selecting "+ add new light" (see screenshot one in FIG. 3). The mobile device detects the light assemblies that are in proximity to the mobile device and displays the detected devices on the screen of the mobile device.

A user then selects a light assembly to connect to on the "Select a Light" menu. Then, the user selects "Cancel" or "Pair" on the Bluetooth pairing request prompt. If the user selects cancel, the pairing between the mobile device and the Bluetooth module of the light assembly is ended. If the user selects "Pair", the application will display a menu, such as a color tile menu (see screenshot four in FIG. 3). In order to pair the mobile device with the Bluetooth module of the light assembly, a user must match the color tile on the mobile device with the color displayed on the light assembly being connected to. For example, when the application instructs the light assembly to generate a blue light, the user must then select the blue tile on the color tile. If the user does not select the correct color, the application will consider the pairing failed and display "pairing failed" and end the pairing between the mobile device in the Bluetooth module of the light assembly. If the user selects the correct color, then the application will instruct the light assembly to generate a second color. Again, the user must match the color tile on the mobile device with the second color displayed by the light being connected to.

If the user does not correctly select the color that matches the second color of the light output of the light assembly, the application will display "pairing failed" and end the pairing between the mobile device in the Bluetooth module of the light assembly. If the user correctly matches the color tile on the mobile device with the second color displayed by the light being connected to, the application will instruct the light assembly to generate a third color. Again, the user must then match the color tile of the mobile device to the color displayed on the light being connected to.

If the user does not correctly select the color that matches the color of the light output of the light assembly, the application will display "pairing failed" and end the pairing between the mobile device and the Bluetooth module of the light assembly. If the user correctly matches the color tile on the mobile device with the color displayed on the light being connected to, the application will display a "paired" notification and pair the mobile device with the Bluetooth module of the light assembly, ending the pairing process.

This pairing system and method may be beneficial for any one or more of the following reasons:

1. No need to have a numerical passkey
2. The user does not have to worry about losing the passkey and having to go through the trouble of resetting it
3. If a user has 2 or more Bluetooth devices they are trying to connect to, they can easily distinguish which module they are connecting to since the light will change to a different color when they select it from the list of lights to connect to.
4. In a production environment, such as incoming inspection or testing, a tester simply powers on the Bluetooth module and follows the connection procedure.
5. In a production environment, such as an assembly line, when the Bluetooth modules and lights are installed in a unit, they may not be easily accessible to end of line testers. If there were a passkey required to be able to connect to the modules, the passkey would need to be documented and provided to production.
6. Another case related to an assembly line, if there are multiple units with Bluetooth modules powered on, the testers would not be able to differentiate which module they need to connect to. They would have to turn off nearby units or go through the trouble of trying to connect to different modules until they connected to the correct one. The ability to connect to the correct module using visuals provides a significant benefit.

It should be understood that while device 16 is described above in the context of a smart phone, device 16 may comprise a mobile handset, a personal digital assistant, a laptop computer, a headset, a vehicle hands free device, or any other electronic device that can provide remote control and further provide a user input interface (e.g. display or microphone) to input the code.

It should also be understood by those skilled in the art that the various flow chart steps described in connection with the embodiments disclosed herein may be implemented as electronic hardware, computer software, or combinations of both. The steps of the method described in connection with the embodiments disclosed herein may be embodied directly in hardware, in a software module executed by a processor, or in a combination of the two.

While the several embodiments have been shown and described, it will be understood that various omissions, substitutions, and changes in the form and details of the device or process illustrated may be made by those skilled in the art without departing from the scope of the invention. As will be recognized, the invention may be embodied within a form that does not provide all of the features and benefits set forth herein, as some features may be used or practiced separately from others.

We claim:

1. A method of associating electronic devices to allow remote control of at least one of the electronic devices comprising:
   detecting a light assembly with a hand-held remote control device;
   transmitting a pairing signal to the light assembly with the hand-held remote control device;
   the light assembly generating a series of non-numerical codes generated in a sequence, the series including a first non-numerical code and a second non-numerical code after the first non-numerical code, the light assembly generating the second non-numerical code only after a user has entered at the hand-held remote control device an input corresponding to the first non-numerical code; and
      based on user input at the hand-held remote control device corresponding to the series of non-numerical codes, pairing the hand-held remote control device with the light assembly wherein only thereafter is the hand-held remote control device operable to control the light assembly.

2. The method according to claim 1, the generating a series of non-numerical codes further includes generating a third non-numerical code after the second non-numerical code, the light assembly generating the third non-numerical code only after a user has entered at the hand-held remote control device an input corresponding to the first and second non-numerical codes in the sequence.

3. The method according to claim 2, the generating a series of non-numerical codes further includes generating a fourth non-numerical code after the third non-numerical code, the light assembly generating the fourth non-numerical code only after a user has entered at the hand-held remote control device an input corresponding to the first, second, and third non-numerical codes in the sequence.

4. The method according to claim 1, wherein the pairing includes pairing the light assembly with the hand-held remote control device with a Bluetooth transceiver of the light assembly.

5. The method according to claim 1, wherein the generating the series of non-numerical codes comprises emitting light with the light assembly with specific colors.

6. The method according to claim 5, wherein the emitting light with the light assembly with specific colors includes emitting a series of colors of light from the light assembly.

7. The method according to claim 6, further providing the hand-held remote control device with a display, and displaying a selectable icon corresponding the series of colors to allow a user to generate the input in response to the non-numerical code.

8. The method according to claim 7, wherein the providing a display comprises providing a touch screen having a touch selectable colored icon for each of the series of colors selectable by the user to generate the input in response to the non-numerical code.

9. The method according to claim 5, further comprising conditioning the pairing on the user entering the input corresponding to the series of non-numerical codes within a time out period.

10. A lighting system comprising:
    a hand-held remote control device including a controller and a wireless transceiver;
    a light assembly including at least one light source, a controller for connection to a power source and to control the light when powered, and a wireless transceiver for communication with the wireless transceiver of the remote control device; and
       wherein the hand-held remote control device is configured to detect the light assembly and to transmit a pairing signal to the light assembly, the pairing signal prompting the controller of the light assembly to generate a series of non-numerical codes generated in a sequence, the series including a first non-numerical code and a second non-numerical code after the first non-numerical code, the light assembly configured to generate the second non-numerical code only after a user has entered at the hand-held remote control device an input corresponding to the first non-numerical code and to pair the light assembly with the hand-held remote control device in response to input from a user at the hand-held remote control device corresponding to the series of non-numerical codes wherein the hand-held remote control device only thereafter is paired with the light assembly to allow the hand-held remote control device to remotely control the light assembly.

11. The lighting system to claim 10, wherein the controller of the light assembly conditions pairing on the user entering the input corresponding to the non-numerical code within a time out period.

12. The lighting system according to claim 10, wherein the transceiver comprises a Bluetooth transceiver.

13. The lighting system according to claim 10, wherein the non-numerical codes each comprises light emitted by the light assembly.

14. The lighting system according to claim 13, wherein at least one of the non-numerical codes comprises a color of light emitted by the light assembly.

15. The lighting system according to claim 14, wherein the non-numerical codes comprise a series of colors of light emitted by the light assembly.

16. The lighting system according to claim 15, wherein the hand-held remote control device has a display, and the display displaying the series of colors selectable by a user to generate the input in response the non-numerical code.

17. The lighting system according to claim 16, wherein the display is a touch screen having a menu of touch selectable icons, each touch selectable icon being associated with a color of the series of colors and being selectable by the user to generate the input in response to the non-numerical code.

18. The lighting system according to claim 16, wherein the display is configured to display a selection of lights and to allow a user to select a light to be paired from the selection of lights.

* * * * *